Oct. 8, 1935.  A. M. CRAMER  2,016,413
VALVE ORGANIZATION
Original Filed June 22, 1933
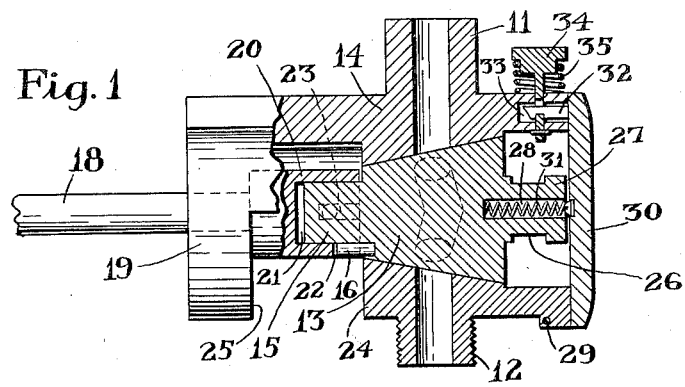
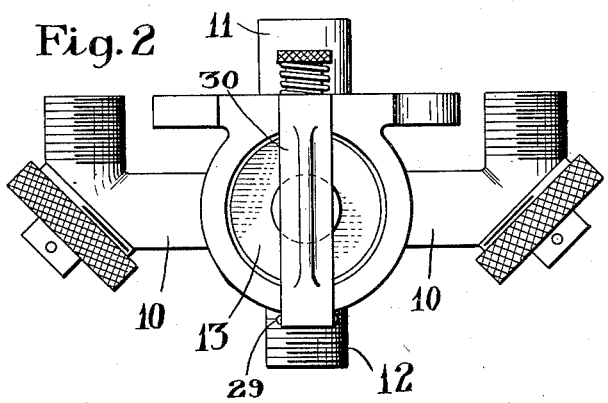
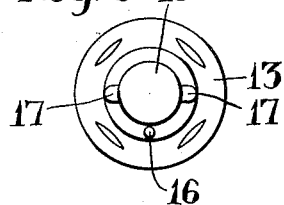
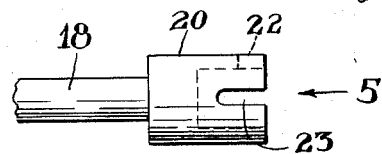
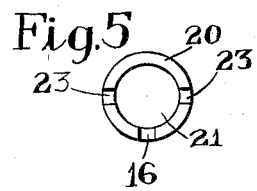
WITNESSES:
INVENTOR:
Albert M. Cramer
BY
ATTORNEY Patented Oct. 8, 1935

2,016,413

UNITED STATES PATENT OFFICE 2,016,413

VALVE ORGANIZATION

Albert M. Cramer, Philadelphia, Pa., assignor to Horn & Hardart Baking Company, Philadelphia, Pa., a corporation of New Jersey Original application June 22, 1933, Serial No. 677,053. Divided and this application December 1, 1933, Serial No. 700,389

1 Claim. (Cl. 251—112)

This invention relates to valve structures, and is a division of application Serial No. 677,053, filed June 22, 1933, for "Liquid dispensing device".

An object of the invention is to provide a valve organization from which the valve may be readily and conveniently removed for cleansing purposes, and returned into such relation with the actuating stem as to at all times function properly in its housing.

A further object of the invention is to provide improved means for holding the valve yieldingly to its seat, and to permit the ready removal and restoration of said valve.

The invention, therefore, comprises a valve housing having a tapered valve seat with a conduit forming communication through the valve with a spindle mounted in axial alinement with the valve, and having a recess adapted to receive a lug formed upon the valve body only in one particular rotary relation to the valve stem, the said valve having at its end opposite the lug, a recess to receive a spring which is carried by a hinged member which, in turn, is controlled by a manual detent for holding the spring under tension against the valve.

In the drawing,

Figure 1 is a view partly in side elevation, but principally in section substantially diametrical of the valve body, Figure 2 is a view in end elevation of the valve and its housing, Figure 3 is a view of the valve in end elevation, Figure 4 is a fragmentary view in side elevation of the spindle, and Figure 5 is a view of the spindle in end elevation, as indicated by arrow "5" at Figure 4.

Like characters of reference indicate corresponding parts throughout the several views.

The improved valve installation entering into this application as a division of application Serial No. 677,053, is shown at Figure 2 as embodying the conduits 10 of said application, together with the vertical conduits 11 and 12. All of these conduits are controlled by the valve 13 in substantially the usual and ordinary manner of four-way valves. As will be noted from Figure 1, the valve 13 is a tapered valve fitting a tapered valve seat in the housing structure 14 and with a lug 15 which extends through such housing. The valve is provided with a stud 16 and with two diametrically extending pins 17.

The stem 18 is mounted in the block 19 and has an enlarged hub 20 with a socket 21 therein properly proportioned to receive the lug 15 of the valve. The hub is also provided with a number of longitudinally extending slots, one short slot 22 being of proper length to receive the stud 16 and longer slots 23 diametrically positioned properly proportioned to receive the pins 17.

As the hub 20 is fixed against longitudinal movement by the abutments 24 and 25, it is obvious that it is capable of only a rotary action. The position and relation of the stud 16 and pin 17 to the slots 22 and 23 are such that the lug 15 of the valve can only be entered in the recess 21, when the pins 17 and stud 16 properly register with their particular slots.

At its opposite end, the valve 13 is provided with a neck 26 terminating in a head 27, the head being for the purpose of convenience in handling. The neck is provided with an axial bore 28. Fulcrumed at 29 is a bar 30, which carries a spring 31 properly proportioned to enter the bore 28, and exert yielding tension upon the valve to hold the valve to seat while permitting rotary movement thereof.

The bar 30 is provided with a finger 32, which is positioned to enter into a recess 33. Coacting with this finger 32 is a latch 34 controlled by a spring 35. In operation, by depressing the latch 34, the finger 32 is released and the spring 31 imparts to the bar 30 an initial movement which may be manually continued until the spring 31 is withdrawn from the bore 28 and the valve fully released. By engagement with the head 27 the valve may be now readily removed for cleansing purposes. In the parent application, the structure being directed to a liquid dispensing device, particularly accentuated sanitary construction and means whereby the parts could be readily and successfully cleansed.

The present valve structure which, in fact, forms a part of the complete organization disclosed in the parent application, lends itself to such removal for the cleansing of the valve itself and the several conduits which form communication with the valve.

After cleansing, it is obvious that the valve may be returned to the housing and manually rotated until the several pins and studs find proper seat in their respective slots in the hub 20 of the stem, whereupon the spring 31 is again entered in the bore 28, the bar 30 latched in position and the valve is ready to be rotated or oscillated by means of the stem 18.

Of course the valve herein illustrated may be modified and changed in various ways without departing from the invention herein set forth and hereafter claimed.

I claim:—

A valve structure comprising a housing having a tapered valve seat, a tapered valve rotatably mounted in said seat, a valve stem journalled in axial alignment with said valve, a separable connection between said stem and the smaller end of said valve adapted for co-operative engagement in only one relative rotative position as the valve is inserted longitudinally into position, a headed neck extending axially from the larger end of the valve and provided with an axial bore, a bar pivoted at one end to said housing, a spring actuated latch on said housing for the free end of said bar, said latch being manually depressible for releasing the bar, and a spring in the bore of said neck and impinging against said bar when in fixed position, substantially as described.

ALBERT M. CRAMER